United States Patent
Holland et al.

(10) Patent No.: US 6,985,995 B2
(45) Date of Patent: Jan. 10, 2006

(54) DATA FILE MIGRATION FROM A MIRRORED RAID TO A NON-MIRRORED XOR-BASED RAID WITHOUT REWRITING THE DATA

(75) Inventors: Mark C. Holland, Pittsburgh, PA (US); Brent B. Welch, Mountain View, CA (US)

(73) Assignee: Panasas, Inc., Pittsburgh, PA (US)

( * ) Notice: Subject to any disclaimer, the term of this patent is extended or adjusted under 35 U.S.C. 154(b) by 299 days.

(21) Appl. No.: 10/109,998

(22) Filed: Mar. 29, 2002

(65) Prior Publication Data

US 2003/0188097 A1 Oct. 2, 2003

(51) Int. Cl.
G06F 12/00 (2006.01)

(52) U.S. Cl. .................. 711/114; 711/161; 711/162; 711/100; 711/111; 711/112; 714/5; 714/6; 719/325; 707/204; 709/201; 709/202; 709/203

(58) Field of Classification Search .................. 711/114, 711/161–162, 100, 111, 112; 714/5–6; 719/325; 709/201–203; 707/204; 710/79; 716/6
See application file for complete search history.

(56) References Cited

U.S. PATENT DOCUMENTS

| | | | | |
|---|---|---|---|---|
| 5,392,244 A | | 2/1995 | Jacobson et al. | ........... 365/200 |
| 5,572,661 A | * | 11/1996 | Jacobson | ........................ 714/7 |

(Continued)

OTHER PUBLICATIONS

Winn L. Rosch—Hardware Bible (Third Edition)☐☐Sams Publishing☐☐pp. 994–1001.*
Article by Garth A. Gibson et al. entitled "A Cost–Effective, High–Bandwidth Storage Architecture", pp. 92–103.
Article by Garth A. Gibson and Rodney Van Meter entitled "Network Attached Storage Architecture", pp. 37–45, Communications of the ACM, Nov. 2000, vol. 43, No. 11.
Article by Andreas Dilger & Peter J. Braam entitled "Object Based Storage HOWTO", pp. 1–13, Version 2, Dec. 23, 1999, available at http://www.lustre.org/docs.

*Primary Examiner*—Matthew Kim
*Assistant Examiner*—Zhuo H. Li
(74) *Attorney, Agent, or Firm*—Morgan, Lewis & Bockius LLP

(57) ABSTRACT

A data storage methodology wherein a data file is initially stored in a format consistent with RAID-1 and RAID-X and then migrated to a format consistent with RAID-X and inconsistent with RAID-1 when the data file grows in size beyond a certain threshold. Here, RAID-X refers to any non-mirrored storage scheme employing XOR-based error correction coding (e.g., a RAID-5 configuration). Each component object (including the data objects and the parity object) for the data file is configured to be stored in a different stripe unit per object-based secure disk. Each stripe unit may store, for example, 64 KB of data. So long as the data file does not grow beyond the size threshold of a stripe unit (e.g., 64 KB), the parity stripe unit contains a mirrored copy of the data stored in one of the data stripe units because of the exclusive-ORing of the input data with "all zeros" assumed to be contained in empty or partially-filled stripe units. When the file grows beyond the size threshold, the parity stripe unit starts storing parity information instead of a mirrored copy of the file data. Thus, the data file can be automatically migrated from a format consistent with RAID-1 and RAID-X to a format consistent with RAID-X and inconsistent with RAID-1 without the necessity to duplicate or rewrite the stored data.

23 Claims, 7 Drawing Sheets

U.S. PATENT DOCUMENTS

| | | | | |
|---|---|---|---|---|
| 5,574,851 A | * | 11/1996 | Rathunde | 714/7 |
| 5,659,704 A | * | 8/1997 | Burkes et al. | 711/114 |
| 5,881,311 A | | 3/1999 | Woods | 395/824 |
| 5,937,174 A | | 8/1999 | Weber | 395/309 |
| 5,946,686 A | | 8/1999 | Schmuck et al. | 707/10 |
| 5,956,734 A | | 9/1999 | Schmuck et al. | 707/205 |
| 5,960,169 A | * | 9/1999 | Styczinski | 714/6 |
| 5,960,446 A | | 9/1999 | Schmuck et al. | 707/205 |
| 5,974,503 A | * | 10/1999 | Venkatesh et al. | 711/114 |
| 5,987,477 A | | 11/1999 | Schmuck et al. | 707/201 |
| 6,023,706 A | | 2/2000 | Schmuck et al. | 707/200 |
| 6,052,759 A | * | 4/2000 | Stallmo et al. | 711/114 |
| 6,138,125 A | * | 10/2000 | DeMoss | 707/202 |
| 6,275,898 B1 | * | 8/2001 | DeKoning | 711/114 |
| 6,298,401 B1 | * | 10/2001 | Anderson | 710/74 |
| 6,405,284 B1 | * | 6/2002 | Bridge | 711/114 |
| 6,513,093 B1 | * | 1/2003 | Chen et al. | 711/4 |
| 6,691,209 B1 | * | 2/2004 | O'Connell | 711/114 |
| 6,795,895 B2 | * | 9/2004 | Merkey et al. | 711/114 |
| 6,862,609 B2 | * | 3/2005 | Merkey | 709/214 |
| 2002/0194427 A1 | * | 12/2002 | Hashemi | 711/114 |
| 2003/0120723 A1 | * | 6/2003 | Bright et al. | 709/203 |

\* cited by examiner

Initial RAID-1 Storage

Migration to RAID-5

Initial RAID-1 Storage

Migration to RAID-5

DATA FILE MIGRATION FROM A MIRRORED RAID TO A NON-MIRRORED XOR-BASED RAID WITHOUT REWRITING THE DATA

BACKGROUND

1. Field of the Invention

The disclosed invention generally relates to data storage methodologies, and, more particularly, to an object-based methodology in which a data file is migrated from RAID-1 to a non-mirrored RAID scheme employing an XOR-based error correcting code without rewriting the data contained in the data file.

2. Description of Related Art

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures. One group of schemes for fault tolerant data storage includes the well-known RAID (Redundant Array of Independent Disks) levels or configurations. A number of RAID levels (e.g., RAID-0, RAID-1, RAID-3, RAID-4, RAID-5, etc.) are designed to provide fault tolerance and redundancy for different data storage applications. A data file in a RAID environment may be stored in any one of the RAID configurations depending on how critical the content of the data file is vis-à-vis how much physical disk space is affordable to provide redundancy or backup in the event of a disk failure.

FIGS. 1 and 2 illustrate traditional RAID-1 and RAID-5 storage arrangements respectively. As is known in the art, RAID-1 employs "mirroring" of data to provide fault tolerance and redundancy. FIG. 1 shows an exemplary mirroring arrangement wherein four disks 10, 18, 26 and 34 are used to provide mirroring. The contents of disk 10 are mirrored onto disk 18, and the contents of disk 26 are mirrored onto disk 34. The data on each physical disk is typically stored in "blocks", which contain a number of disk sectors to store the incoming data. In other words, the total physical disk space is divided into "blocks" and "sectors" to store data. FIG. 1 shows the contents of blocks 12, 14 and 16 of the primary disk 10 mirrored onto blocks 20, 22 and 24 respectively of the secondary or mirror disk 18. Similarly, the contents of blocks 28, 30 and 32 of the primary disk 26 are shown mirrored onto blocks 36, 38 and 40 respectively of the mirror disk 34. Each block may be of the same, predetermined size (e.g., 8 KB).

As is known in the art, the storage mechanism provided by RAID-1 is not the most economical or most efficient way of providing fault tolerance. Although RAID-1 storage systems are simple to design and provide 100% redundancy (and, hence, increased reliability) during disk failures, RAID-1 systems substantially increase the storage overhead because of the necessity to mirror everything. The redundancy under RAID-1 typically exists at every level of the system—from power supplies to disk drives to cables and storage controllers—to achieve full mirroring and steady availability of data during disk failures.

On the other hand, RAID-5 allows for reduced overhead and higher efficiency, albeit at the expense of increased complexity in the storage controller design and time-consuming data rebuilds when a disk failure occurs. FIG. 2 illustrates an exemplary data storage arrangement showing data stored among five disks 50, 54, 58, 62 and 66 in RAID-5 configuration. RAID-5 uses the concepts of "parity" and "striping" to provide redundancy and fault tolerance. Simply speaking, "parity" can be thought of as a binary checksum or a single bit of information that tells the operator if all the other corresponding data bits are correct. RAID-5 creates blocks of parity, where each bit in a parity block corresponds to the parity of the corresponding data bits in other associated blocks. The parity data is used to reconstruct blocks of data read from a failed disk drive. Furthermore, RAID-5 uses the concept of "striping", which means that two or more disks store and retrieve data in parallel, thereby accelerating performance of data read and write operations. To achieve striping, the data is stored in different blocks on different drives. A single group of blocks and their corresponding parity block may constitute a single "stripe" within the RAID set. In RAID-5 configuration, the parity blocks are distributed throughout all the disk drives, instead of storing all the parity blocks on a single disk. Algorithms for deciding where a particular stripe's parity block resides within the array of disk drives are known in the art.

FIG. 2 illustrates a RAID-5 data storage through striping. For the sake of simplicity and ease of illustration, all blocks in a single disk are referred to by the same numeral. Thus, each block on disk 50 is designated by the same reference numeral "52", each block on disk 54 is designated by the same reference numeral "56", and so on. As shown in FIG. 2, the "0 stripe" includes all "zero" data blocks (i.c., data blocks A0, B0, C0 and D0) and the corresponding "zero" parity block 68 (on disk 66). Similarly, the data blocks A1, B1, C1 and E1 and their corresponding parity block 64 (i.e., the "1 parity" block on disk 62) constitute the "1 stripe". The data blocks and corresponding parity blocks for the "2 stripe", "3 stripe" and "4 stripe" are also shown. As can be seen from FIG. 2, each parity block is stored on a different disk, thereby distributing or "staggering" the parity storage throughout all the disks. The staggering of parity blocks ensures that I/O (input/output) operations needed to read or write parity blocks are distributed throughout the RAID disk set. The parity generation function is symbolically indicated by block 70 in FIG. 2. However, the design of RAID-5 disk controllers implementing parity and striping is quite involved and complex when compared with a relatively simpler disk controller for achieving mirroring under RAID-1.

As noted earlier, RAID-1 implements fault tolerance at the expense of increased overhead (i.e., doubling of storage space). On the other hand, RAID-5 reduces storage space overhead by using the concepts of parity and striping as discussed hereinabove. Furthermore, RAID-1 is more "write-efficient" (i.e., less write latency) than RAID-5 in the sense that a data write operation involves fewer I/O operations under RAID-1 than under RAID-5. For example, when the existing data in a sector on a disk block is to be replaced with new data, a RAID-1 controller may need to perform two I/O operations to write the new data on the disk sector as opposed to four I/O operations needed by a RAID-5 controller. To explain further, the RAID-1 configuration will require the following two I/O operations: (1) Write the new data in the appropriate sector on the block on the primary disk, and (2) also write the new data in the appropriate sector on the corresponding block on the mirrored disk. On the other hand, the RAID-5 configuration will require the following four I/O operations: (1) Read the data from appropriate sector on each disk associated with the stripe for the data to be replaced, (2) compute the new parity using the new data and the data from each disk in the stripe obtained in step (1), (3) write the new data in place of the old data on the appropriate disk sector, and (4) write the newly-computed parity in the appropriate data sector on the corresponding disk storing parity information.

Thus, as can be seen from the foregoing, when storage space overhead is not too critical (i.e., when storing a smaller size (e.g., 32 KB) data file), it is preferable to store the data file as a RAID-1 file to reduce write latency inherent in a RAID-5 storage. On the other hand, when the RAID-1 file grows to a larger size or when another large data file is to be stored (e.g., a file size of more than 32 KB), it becomes desirable and more economical to store the grown data file or the new data file in a RAID-5 configuration to substantially reduce the storage overhead inherent in a RAID-1 storage configuration. Thus, a combination of RAID-1 storage for smaller data files and RAID-5 storage for larger data files allows better write performance of RAID-1, while still keeping the total fraction of all capacity consumed by redundancy at a low level.

To illustrate the foregoing concept of selecting different RAID configurations for different file sizes, it is noted that trace studies have shown that in a typical file system a large majority of files are small in size (i.e., in the range of 10 KB in size), whereas the large majority of total storage capacity is typically consumed by a few large files (of 10–100 MB or more). For example, in a file system containing 100 files with 95 files of 1 KB size and 5 remaining files of 50 MB each, the following storage capacity may be required when RAID-1 configuration is used to store 95 small files and 10+1 RAID-5 configuration (i.e., 10 disks for data and 1 disk for parity) is used to store 5 large files.

$$\text{Bytes storing user data} = (95 \times 1 \text{ KB}) + (5 \times 50 \text{ MB}) = 250.095 \text{ MB}$$

$$\text{Bytes storing redundant data} = (95 \times 1 \text{ KB}) + \left(5 \times \frac{1}{10} \times 50 \text{ MB}\right)$$
$$= 25.095 \text{ MB}$$

$$\text{Total bytes stored in the file system} = 250.095 + 25.095 = 275.19 \text{ MB}$$

$$\text{Fraction of storage consumed by redundant information} = \frac{25.095}{275.19}$$
$$= 9.12\%$$

Thus, assuming that all files in those 100 files are written equally often, the storage layout scheme with RAID-1 for small files and RAID-5 for large files allows efficient RAID-1 writes for around 95% of all write accesses, but still keeps total capacity overhead for redundancy at under 10%.

Although the RAID-1/RAID-5 combination helps in achieving write-efficient storage with a reasonable storage overhead, there is a performance penalty to be paid in the prior art storage methodology when a file that is initially small (i.e., stored as a RAID-1 file) grows into a large file necessitating a migration from RAID-1 storage to RAID-5 storage. In that event, the most recent version of the entire file has to be copied from one or more RAID-1 disk blocks/drives to a group of RAID-5 disk blocks/drives. Additionally, the necessary parity block(s) are also required to be computed and stored in appropriate block(s). Such data copying and parity generation for each file growing beyond a certain size may not prove efficient when a large number of files are to be migrated from RAID-1 to RAID-5 configuration. Therefore, it is desirable to devise a storage methodology where RAID-1 to RAID-5 migration takes place without additional file copying operations.

Furthermore, existing data storage systems do not concurrently or adequately address the issues of dynamic load balancing, hierarchical storage management, data backup, fault tolerance, and performance optimization. Management of all those functions separately creates the need for a substantial amount of management and the danger of one function conflicting with another puts the integrity of the data stored at risk. For example, in the RAID-5 data storage configuration shown in FIG. 2, a first process running on the computer network attached to the RAID-5 disks 50, 54, 58, 62, 66 may access a sector on block A1 on disk 50 and write data into it. The "1 parity" block will then be updated in view of this newly written data. The first process may not write anything thereafter to the data file in "1 stripe." However, a second process (which is unrelated to the first process) may then write different data on a sector on block C1, thereby changing the file content as well as the parity information. This may produce an error message when the first process next accesses the data file in "1 stripe" and notices the different parity information. The second process itself may have accessed the data file in error. But, because of sector- and block-based accesses allowed in traditional RAID-5 storage systems, such data and parity overwriting/corruption may not be easily avoidable because each network process accessing a data file may be capable of accessing only a part of that data file, which part may not have any relation to another part accessed by another process. Therefore, it is desirable to devise a data storage mechanism that preserves data integrity when a file is being shared among a number of processes.

Thus, there is a need for a storage system that concurrently and adequately provides for dynamic load balancing, hierarchical storage management, data backup, fault tolerance, and performance optimization.

SUMMARY

In one embodiment, the present invention contemplates a method for storing a data file object in a storage system having a plurality of storage disks such as, for example, object based secured disks (or OBDs). The method includes striping the data file object across the plurality of storage disks using a plurality of data stripe units and one or more parity stripe units, wherein each stripe unit in the plurality of data stripe units and in the one or more parity stripe units is allocated a respective storage space in a different one of the plurality of storage disks; initially storing the data file object in a first format consistent with RAID-1 and RAID-5 using a first data stripe unit from the plurality of data stripe units and a first parity stripe unit from the one or more parity stripe units, wherein the first parity stripe unit maintains a mirrored copy of a first data contained in the first data stripe unit; continuing storing the data file object in the first format consistent with RAID-1 and RAID-5 until the size of the first data exceeds the respective storage space allocated to the first data stripe unit; and migrating from storing the data file object in the first format consistent with RAID-1 and RAID-5 to storing the data file object in a second format consistent with RAID-5 and inconsistent with RAID-1 when the size of the first data exceeds the respective storage space allocated to the first data stripe unit, wherein the migration being performed without rewriting the first data.

In the object-based data storage methodology according to the present invention, a data file is initially created as an aggregate RAID-5 file object and its each component object (including the data objects and the parity object) is configured to be stored in a different stripe unit per object-based secure disk. Each stripe unit may store, for example, 64 KB of data. A blank component object (i.e., a component object without any data) or a partially-filled component object is treated as having all zeros stored in that portion of the component object where no data is presently stored. So long as the data file does not grow beyond the size threshold of a stripe unit (e.g., 64 KB), the parity stripe unit contains a mirrored copy (i.e., RAID-1 storage) of the data stored in one of the data stripe units because of the exclusive-ORing of the input data with the all-zero content assumed in empty or partially-filled stripe units.

When the file grows beyond the size threshold (here, 64 KB), the parity stripe unit starts storing the parity information (i.e., RAID-5 storage) instead of a mirrored copy of the file data. Thus, with proper determination of a stripe unit size, among other things, a data file can be automatically migrated from RAID-1 storage (mirrored disks) to RAID-5 storage (rotating parity) without the necessity to duplicate or rewrite the stored data in RAID-5 configuration. The teachings of the present invention may also be used to migrate a data file from RAID-1 to any non-mirrored storage scheme that employs an XOR-based error correcting code (e.g., RAID-4). Use of such a storage methodology leads to many improvements in data storage performance and reliability. The object-based data storage methodology allows creation of a storage system that concurrently and adequately provides for dynamic load balancing, hierarchical storage management, data backup, fault tolerance, and performance optimization. In one embodiment, the present invention also provides a data storage mechanism that preserves data integrity when a file is being shared among a number of processes or clients.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 3:
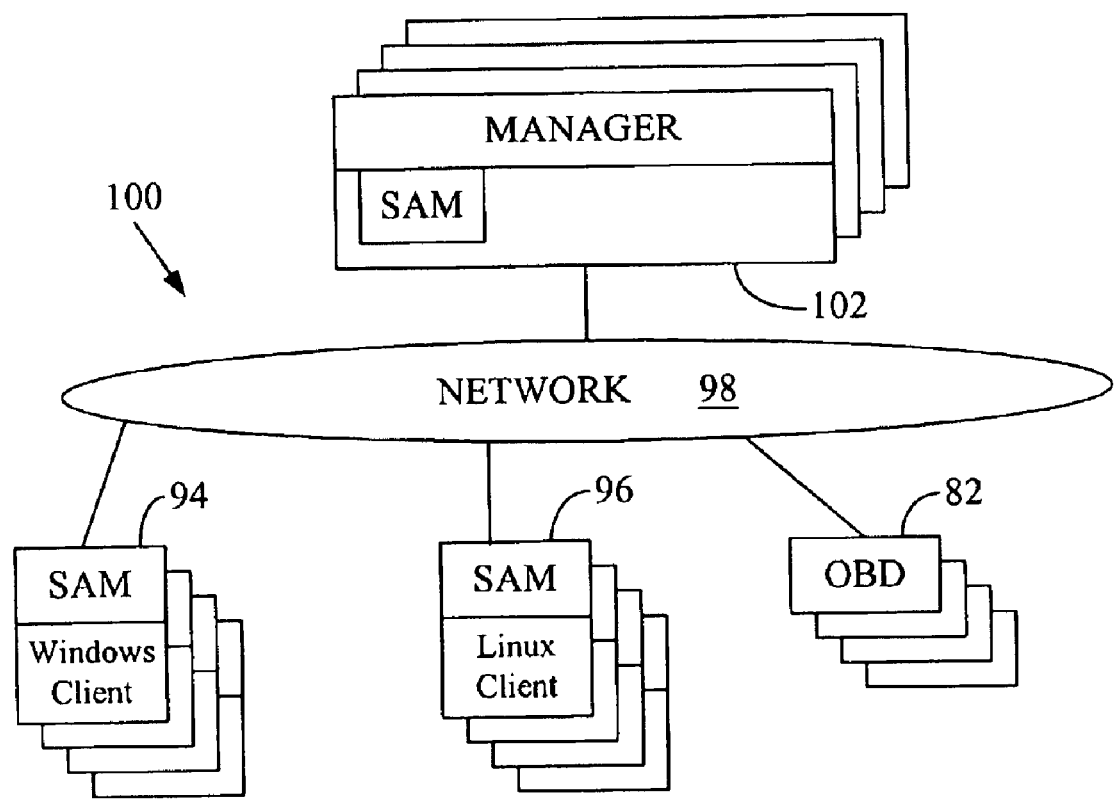
FIG. 3 illustrates an exemplary network-based file storage system designed around Object Based Secure Disks (OBSDs or OBDs)

FIG. 3 illustrates an exemplary network-based file storage system 100 designed around Object Based Secure Disks (OBSDs or OBDs) 82. The file storage system 100 is implemented via a combination of hardware and software units and generally consists of the manager software (simply, the "manager") 102, OBDs 82, and clients 94, 96. It is noted that each manager is an application program code or software running on a corresponding server. The server functionality may be implemented with a combination of hardware and operating software. FIG. 3 illustrates a group of clients or client computers 94 running on Microsoft Windows® operating system, whereas another group of clients 96 are running on the Linux® operating system. The clients 94, 96 thus present an operating system-integrated file system interface. The semantics of the host operating system (e.g., Windows®, Linux®, etc.) may preferably be maintained by the file system clients. The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

FIG. 3 shows a number of OBDs 82 attached to the network 98. An OBSD or OBD 82 is a physical disk drive that stores data files in the network-based system 100 and may have the following properties: (1) it presents an object-oriented interface rather than the prior art sector-oriented interface discussed hereinbefore; (2) it attaches to a network (e.g., the network 98) rather than to a data bus or a backplane (i.e., the OBDs 82 may be considered as first-class network citizens); and (3) it enforces a security model to prevent unauthorized access to data stored thereon.

The fundamental abstraction exported by an OBD 82 is that of an "object," which may be defined as a variably-sized ordered collection of bits. Contrary to the prior art block-based storage disks, OBDs do not export a sector interface at all during normal operation. Objects on an OBD can be created, removed, written, read, appended to, etc. OBDs do not make any information about particular disk geometry visible, and implement all layout optimizations internally, utilizing higher-level information that can be provided through an OBD's direct interface with the network 98. In one embodiment, each data file and each file directory in the file system 100 are stored using one or more OBD objects. Because of object-based storage of data files, each file object may generally be read, written, opened, closed, expanded, created, deleted, moved, sorted, merged, concatenated, named, renamed, and include access limitations. Each OBD 82 communicates directly with clients 94, 96 on the network 98, possibly through routers and/or bridges. The OBDs, clients, managers, etc., may be considered as "nodes" on the network 98. In system 100, no assumption needs to be made about the network topology (as noted hereinbefore) except that each node should be able to contact every other node in the system. The servers (e.g., servers 102) in the network 98 merely enable and facilitate data transfers between clients and OBDs, but the servers do not normally implement such transfers.

Logically speaking, various system "agents" (i.e., the clients 94, 96, the managers 102 and the OBDs 82) are independently-operating network entities. The manager 102 may provide day-to-day services related to individual files and directories, and the manager 102 may be responsible for all file- and directory-specific states. The manager 102 creates, deletes and sets attributes on entities (i.e., files or directories) on clients'behalf. The manager 102 also carries out the aggregation of OBDs for performance and fault tolerance. "Aggregate" objects are objects that use OBDs in parallel and/or in redundant configurations, yielding higher availability of data and/or higher I/O performance. Aggregation is the process of distributing a single data file or file directory over multiple OBD objects, for purposes of performance (parallel access) and/or fault tolerance (storing redundant information). The aggregation scheme (or "layout") used by any particular object may be an attribute of that object stored on an OBD, so data storage performance and fault tolerance features can be selected object-by-object. A system administrator (e.g., a human operator or software) may choose any layout or aggregation scheme for a particular object. Both files and directories can be aggregated. In one embodiment, a new file or directory inherits the aggregation scheme of its immediate parent directory, by default. A change in the layout of an object may cause a change in the layout of its parent directory. The manager 102 may be allowed to make layout changes for purposes of load or capacity balancing.

The manager 102 may also maintain and serve layout maps (discussed later in more detail) and allow clients to perform their own I/O to aggregate objects (which allows a direct flow of data between an OBD and a client), as well as providing proxy service when needed. As noted earlier, individual files and directories in the file system 100 may be represented by unique OBD objects. The manager 102 may also determine exactly how each object will be laid out—i.e., on which OBD or OBDs that object will be stored, whether the object will be mirrored, striped, parity-protected, etc. The manager 102 may also provide an interface by which users may express minimum requirements for an object's storage (e.g., "the object must still be accessible after the failure of any one OBD").

Each manager 102 may be a separable component in the sense that the manager 102 may be used for other file system configurations or data storage system architectures. In one embodiment, the topology for the system 100 may include a "file system layer" abstraction and a "storage system layer" abstraction. The files and directories in the system 100 may be considered to be part of the file system layer, whereas data storage functionality (involving the OBDs 82) may be considered to be part of the storage system layer. In one topological model, the file system layer may be on top of the storage system layer. However, the RAID migration methodology discussed hereinbelow does not require that the file abstraction be layered on top of the storage abstraction. Instead, it is noted that any other abstraction (e.g., a database or a set of "raw" bits) may be layered on top of the storage system layer.

The storage access module (SAM) is a program code module that may be compiled into the managers as well as the clients. For example, the embodiment in FIG. 3 illustrates the SAM compiled into the managers 102, the Windows® clients 94, and the Linux® clients 96. The SAM includes an I/O execution engine that implements simple I/O, mirroring, and RAID migration algorithms (e.g., RAID-1 and RAID-5) discussed below. The SAM generates and sequences the OBD-level operations necessary to implement system-level I/O operations, for both simple and aggregate objects.

Each manager 102 maintains global parameters, notions of what other managers are operating or have failed, and provides support for up/down state transitions for other managers. A benefit to the present system is that the location information describing at what data storage device (i.e., an OBD) or devices 82 the desired data is stored may be located at a plurality of processors (or managers) in the network. Therefore, a client 94, 96 need only identify one of a plurality of manager processors containing access information for the desired data to be able to access that data. The data is then returned to the client directly from the data storage device without passing through a manager. Thus, if a managing processor having primary responsibility for identifying the location of data stored in a data storage device fails, the client need only identify another manager having that mapping information to locate the desired data. Failure of a server in the present system is, therefore, not catastrophic to accessing data in any OBD on the network.

The file system configuration 100 may support many forms of user authentication. In one embodiment, the authentication software includes Kerberos version 5 and Windows Kerberos. Kerberos provides authentication for client/server applications using secret-key cryptography.

The file system illustrated in FIG. 3 may consist of kernel modules in the clients (i.e., client computers 94, 96) and managers (i.e., manager servers 102), user-level code in the managers, and user-level configuration/control tools in the clients. A user-level "library" implementation may also be provided, which can be linked into software applications written specifically to take advantage of a parallel I/O subsystem using a group of OBDs 82. This user-level implementation may be extended to take advantage of out-of-kernel I/O systems such as VIA (Virtual Interface Architecture). The following describes each of these three approaches for client code.

Figure 4:
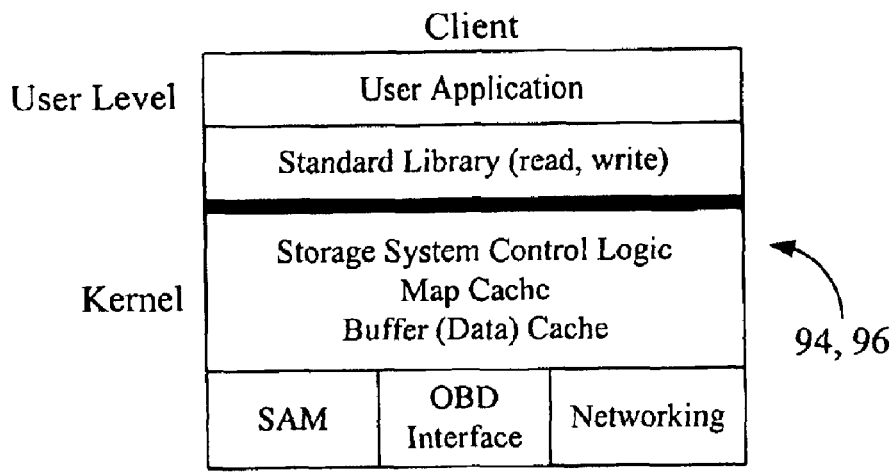
FIG. 4 shows an exemplary in-kernel implementation of the client code according to the present invention.

FIG. 4 shows an exemplary in-kernel implementation of the client code. In the in-kernel implementation, all client code (including control logic, OBD interface code, data cache routines, etc.) for the file storage system 100 resides in the kernel in the corresponding client computer (i.e., in the client computer's operating system software), either in the compiled form or as an installable file system and/or device drivers. The manager code (in various manager servers) may be split between the kernel level and the user level in the corresponding server operating system. In both manager servers and client computers, the networking code residing in the system kernel may be used to interface with the network 98. FIG. 4 illustrates such networking code resident in the client computer operating system kernel portion.

Figure 5:
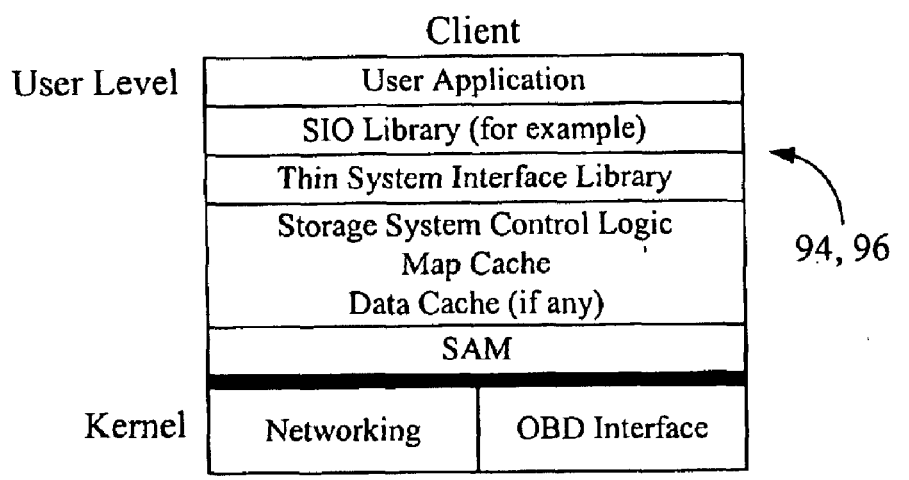
FIG. 5 depicts an exemplary user-level implementation of the client code according to the present invention.
Figure 6:
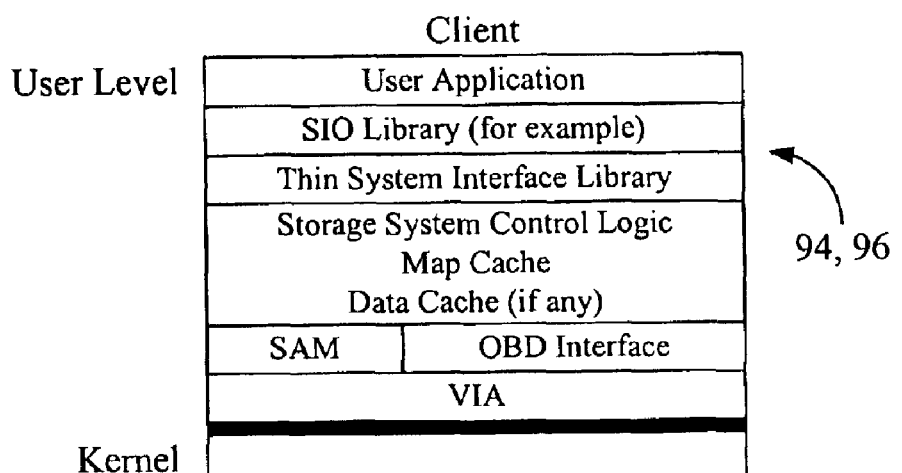
FIG. 6 illustrates an exemplary client code implementation utilizing out-of-kernel I/O systems such as VIA (Virtual Interface Architecture)

FIG. 5 depicts an exemplary user-level implementation of the client code. The client code may be written so that the same code can run both in the kernel (as shown in FIG. 4) and out of it (as shown in FIGS. 5 and 6). Out of kernel operation may be necessary for debugging, but can also be used to allow client computers to access various operations supported in the file system 100 without installing drivers or modifying their kernels. In the user-level implementation of FIG. 5, the normal method for accessing the file system 100 (for example, to write data to an OBD) may be via a client library, either directly invoking the storage system (i.e., the network file storage system 100) read and write methods, or accessing the storage system through one of the well-defined client I/O interface models, such as the SIO (Simultaneous Input Output) library code.

FIG. 6 illustrates an exemplary client code implementation utilizing out-of-kernel I/O systems such as VIA (Virtual Interface Architecture). The Virtual Interface (VI) Architecture specification defines an industry-standard architecture for communication within clusters of servers (e.g., manager servers in FIG. 3) and workstations (e.g., client computers in FIG. 3). These clusters enable enterprise-class performance and scalability utilizing standards-based servers as building blocks. The client code storage model illustrated in FIG. 6 is similar to that shown in FIG. 5, but utilizes a VIA for direct user-level control of the networking hardware. The configuration in FIG. 6 may deliver higher performance by reducing transitions into and out of the kernel.

As noted hereinbefore, the clients 94, 96 may directly access OBDs 82 (bypassing managers) whenever possible, depending on the security model implemented in the system 100. Such direct access may improve data processing (read or write) speed and may also allow realization of the scaling potential of OBDs. Generally, the direct access functionality means that the dataflow for reads and writes will not pass through a third party, and that clients will fetch object (file/directory) attributes without consulting managers. Generally, the clients may directly read and write data, and may also directly read metadata. The managers, on the other hand, may directly read and write metadata. Metadata may include file object attributes as well as directory object contents.

Figure 7:
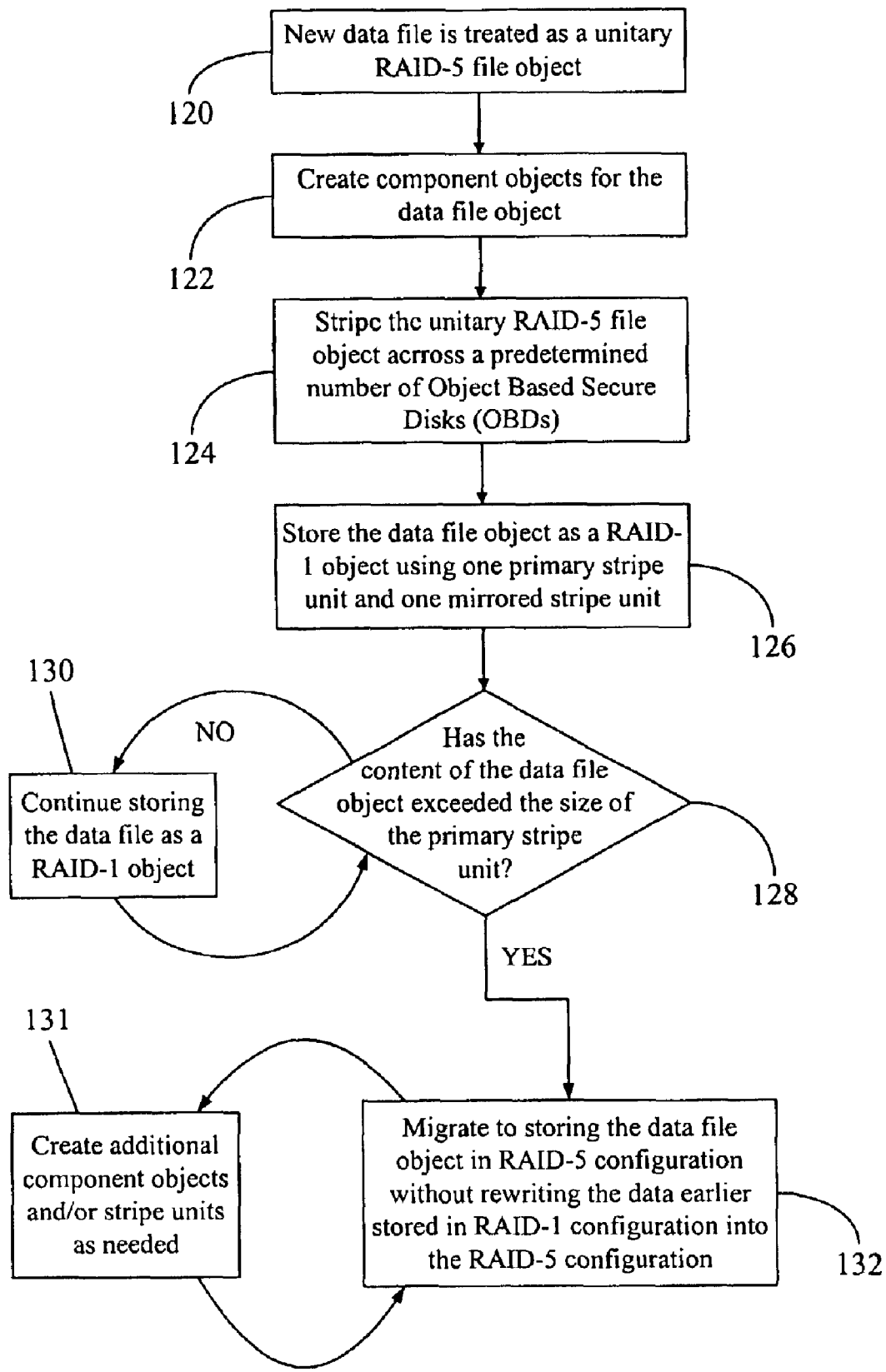
FIG. 7 is an exemplary flowchart illustrating the storage methodology of the present invention wherein a data file is migrated from RAID-1 to RAID-5 storage configuration without rewriting the data contained in the data file.

FIG. 7 is an exemplary flowchart illustrating the storage methodology of the present invention wherein a data file is migrated from RAID-1 to RAID-5 storage configuration without rewriting the data contained in the data file. It is noted that, in addition to RAID-5, the storage methodology described hereinbelow equally applies to migration of a data file from RAID-1 to any non-mirrored storage scheme that employs an XOR-based error correcting code (e.g., RAID-4). The RAID-1 to RAID-5 migration discussed below is given as an example to illustrate the data file migration principles of the present invention and therefore should not be construed to limit the scope of the present invention to migration of a data file from RAID-1 to RAID-5 only.

Referring now to FIG. 7, at block 120, a client 94, 96 may request the manager 102 to create a new (or empty) file, and the manager 102, in turn, lays out or treats that file as a unitary RAID-5 object. At the time of creation of the new data file object, the manager 102 may also create a plurality of component objects for that data file object (block 122), thereby treating the new file as an aggregate object to be stored in RAID-5 configuration. Initially, the number of component objects for the data file may be equal to the number of OBDs 82 in the system 100—one component object per OBD (i.e., each component object is stored on a different OBD). However, in some applications, the number of component objects for a data file may be less than the total number of OBDs in the system. In some other applications, the manager 102 may create additional component objects for the data file as the data storage progresses. In that case, one or more OBDs may each store more than one component object.

After creating component objects for the data file, the manager 102 stripes the unitary RAID-5 file object across an initially predetermined number of OBDs (block 124). This predetermined number may include all or less than all of the OBDs in the storage system. During runtime, the manager 102 may create additional stripe units or component objects (as discussed later hereinbelow) to be stored in those OBDs that were not part of the initial striping at block 124. The manager 102 determines how the new data file is to be stored/striped depending, for example, on the number of OBDs 82 in the system 100 and also on the storage capacity of each OBD 82. In one embodiment, where the total number of OBDs 82 is eleven (11), the manager 102 may determine that the new data file be stored as a (10+1) RAID-5 object across the entire set of eleven OBDs where ten OBDs store the component objects containing the data for the file and one OBD stores the component object containing the RAID-5 parity information for that file (hence the 10+1 RAID-5 configuration). Here, the stripe width (W) includes eleven (11) stripe units. It is noted, however, that the manager 102 does not need to stripe the RAID-5 data file object across the entire set of available OBDs 82 in the system 100. In other words, the manager 102 may not initially predetermine the width (W) of the stripe for the data file object. For example, in the embodiment with eleven OBDs, the manager 102 may initially store the data file object as a 2+1 RAID-5 object using only three of the eleven OBDs (as illustrated, for example, in FIG. 9A). Depending on the size and growth of the data file, the storage capacity of each OBD and the number of OBDs (here, eleven), the manager 102 may later "expand" the stripe width for the data file object—for example, from 2+1 RAID-5 object to 5+1 RAID-5 object. In other words, the manager 102 may dynamically adjust the stripe width for a data file object to be stored in the system 100.

The width (W) of a stripe (i.e., the number of stripe units in the stripe) may typically be set by the number of available OBDs, using some fixed maximum value. For example, if an installation contains 10 OBDs, there cannot be more than ten stripe units per stripe. However, as noted hereinbefore, there can be less than ten stripe units per stripe. On the other hand, if an installation contains 1000 OBDs, it may not be desirable to stripe all of the thousand OBDs because of reliability concerns (for example, a loss of two OBDs out of 1000 OBDs is much more likely than the loss of two OBDs out of 10 OBDs.) In one embodiment, the width (W) of the stripe for a data file may not be pre-selected. Instead, the manager 102 may select the width (W) of the stripe for a data file after the data file has been created and grown to some size. Such a late decision-making as to the width of a stripe may be advantageous in certain situations. For example, assume that a data file grows very slowly in size and that the system may contain only five (5) OBDs at the time the data file is created, but by the time the data file reaches four stripe units in size, new disks have been installed bringing the total number of OBDs to ten (10). By not choosing the width of the stripe until the last minute, the manager 102 can stripe the data file more widely without the need to restripe the data in the data file.

Figure 8A:
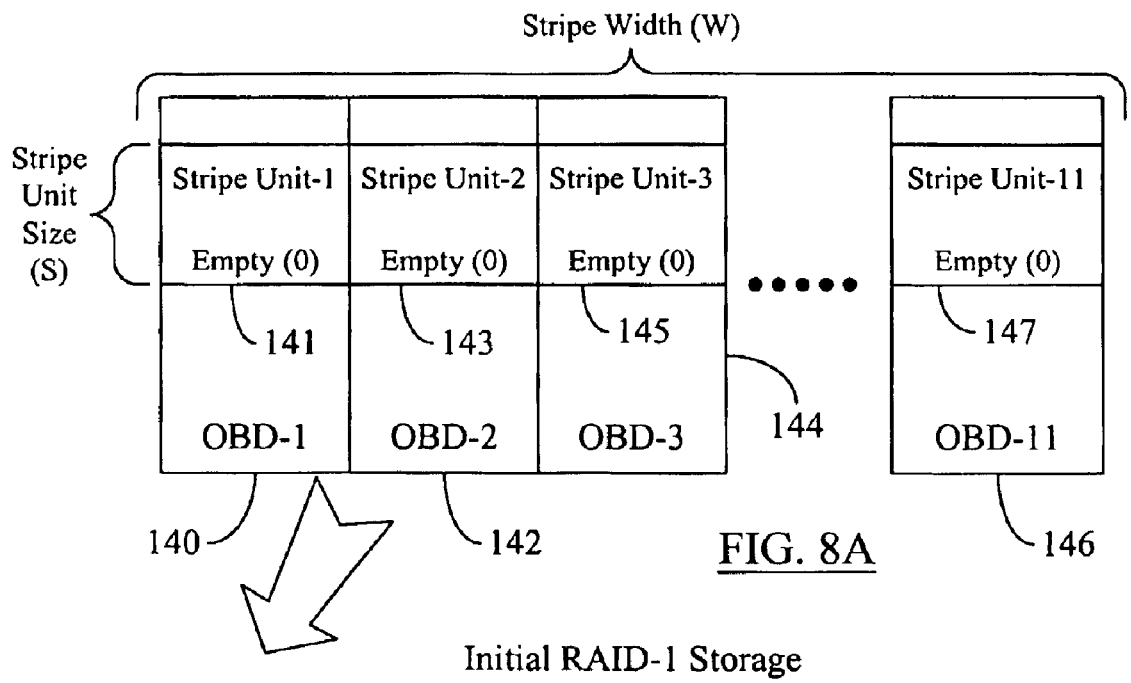
FIG. 8A illustrates an example of how a data file object may be striped across eleven OBDs to be stored as a 10+1 RAID-5 object.

FIG. 8A illustrates an example of how a data file object may be striped across eleven OBDs to be stored as a 10+1 RAID-5 object. Four (140, 142, 144, 146) of these eleven OBDs are shown in detail. Each component object (not shown) for the data file object may have data/parity stored in a corresponding stripe unit 141, 143, 145, and 147 within a corresponding OBD. A "stripe unit" corresponds to a portion of the physical data storage space in an OBD. The embodiment in FIG. 8A thus illustrates one stripe unit per component object and one component object per OBD. However, as noted hereinbefore, there may be more than one component object per OBD, or the total number of component objects may be less than the total number of OBDs in the system, or some component objects may have more than one stripe unit appended thereto depending on the data storage requirements for a particular data file.

As shown in FIG. 8A, each OBD may store data in one or more stripe units depending on the amount of data to be stored, the size (S) of each stripe unit and the total data storage capacity of an OBD. The size (S) of each stripe unit may be for example, 8 KB, 64 KB, etc. There is no restriction on how much data a component object stores, because each component object can store as many stripe units as are required to store the data (so long as the OBD storing that component object has sufficient capacity). Thus, if the size (S) of each stripe unit is predetermined and if the size of the data to be stored exceeds the storage offered by all currently existing stripe units, then the manager 102 may append new stripe units to the existing component objects rather than creating new component objects on the same or different OBDs. The appending of new stripe units reduces capacity overhead and keeps the storage layout map (discussed hereinbelow) for the file smaller. A system designer may alternately configure the manager 102 to create new component objects when such storage expansion is needed.

It is noted that the size (S) of each stripe unit (i.e., the number of bytes in a stripe unit) may be predetermined. In one embodiment, the manager 102 may be configured to select the actual stripe unit size after the data file has been created and grown to some size. In other words, the size of a stripe unit may be determined "on the fly", i.e., dynamically during run-time. In one embodiment, each stripe unit may have the same, fixed size (e.g., 64 KB each). In an alternative embodiment, all the stripe units in the first stripe for a data file may have a smaller size than the stripe units in all other stripes. The "first stripe" may be that set of stripe units which first receives the data for the file object. As discussed hereinbelow, other stripe units (in other stripes) may start receiving data when the content of the data file object grows beyond the size of the first stripe.

Figure 10:
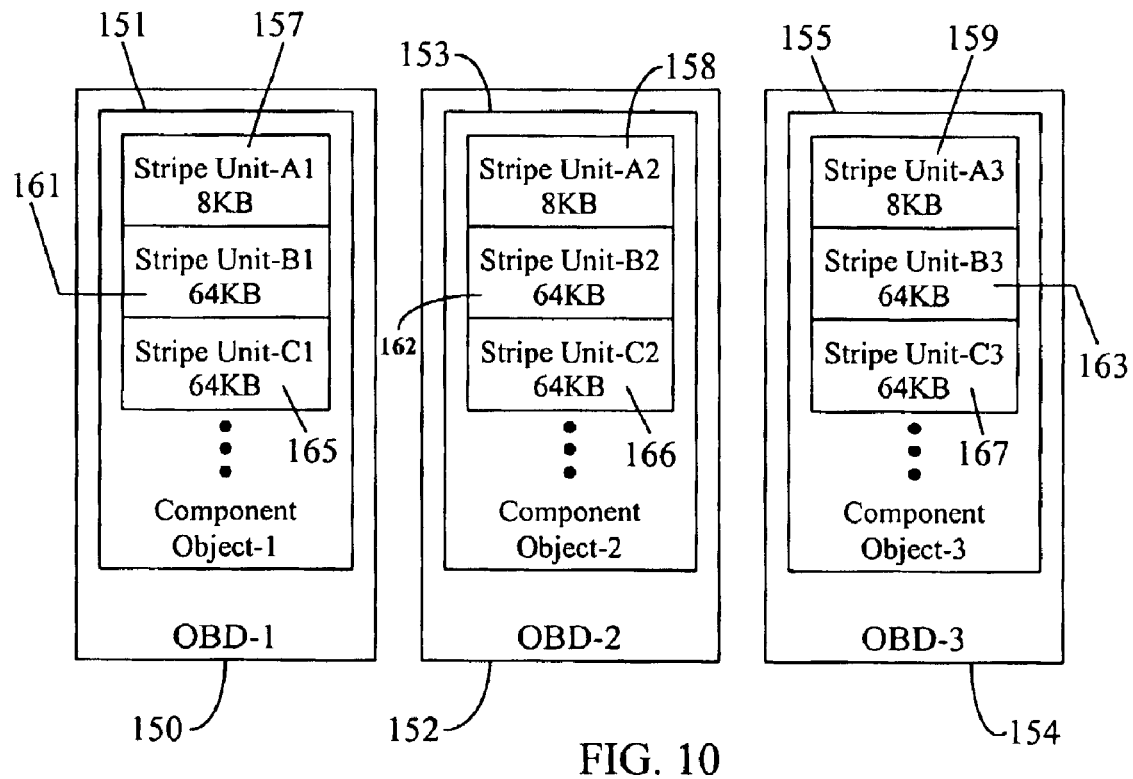
FIG. 10 illustrates an exemplary configuration where the stripe units in the first stripe are smaller in size than the remaining stripe units storing the data file.

FIG. 10 illustrates an exemplary configuration where the stripe units in the first stripe are smaller in size than the remaining stripe units storing the data file. In FIG. 10, three OBDs 150, 152, 154 are shown to store respective components objects 151, 153, 155 for a data file. As noted hereinbefore, each OBD may have many more component objects (not shown) storing the same data file or other data files. Also, although only three stripe units are shown per component object in FIG. 10, there may be more than three stripe units per component object 151–155 as discussed hereinbefore. The stripe units A1–A3 (stripe units 157, 158, 159 respectively) constitute the first stripe (or, stripe A) for the data file to be stored among the three OBDs 150–154. Similarly, stripe units B1–B3 (stripe units 161, 162, 163 respectively) and C1–C3 (stripe units 165, 166, 167 respectively) constitute the second and third stripes respectively (i.e., stripe B and stripe C respectively). As shown in FIG. 10, the size (8 KB) of each stripe unit in the first stripe (stripe A) is smaller than the size (64 KB) of all other stripe units in the storage configuration. The smaller size for the first stripe may be useful in the event that the size of the data to be stored is less than the storage offered by one stripe (excluding the parity stripe unit in the stripe). Using a larger size for subsequent stripe units may improve system performance because of the storage mechanics of OBDs and use of fewer OBDs to store the data file object. The size difference between the first stripe and all other stripes in the storage configuration improves storage capacity performance while increasing data read/write speed.

As noted hereinbefore, the manager 102 maintains a layout map for a file to be stored in the system 100. Every file may have a unique layout map associated with it, and the layout map for a file may reside on one or more OBDs 82. The layout map for a file describes how that file is arranged on the disks (i.e., OBDs 82). In one embodiment, the layout of an object may be selected on a file-by-file basis. A layout map may contain the following: (1) the file storage layout scheme (e.g., RAID-1, RAID-5, etc.); (2) the set of disks (OBDs) used to store the file (e.g., in the embodiment shown in FIG. 8A, the set would include identities of the eleven disks shown in FIG. 8A); (3) the object identifiers used to identify the component objects on each OBD; and (4) any layout-specific information (e.g., the stripe unit size). In the embodiment illustrated in FIG. 8A, the layout map for the newly-created data file object may indicate that it is a 10+1 RAID-5 object with a uniform stripe unit size of 64 KB (for example) or the first stripe with 8 KB stripe units followed by stripes with 64 KB stripe units, whichever is the case.

Figure 2:
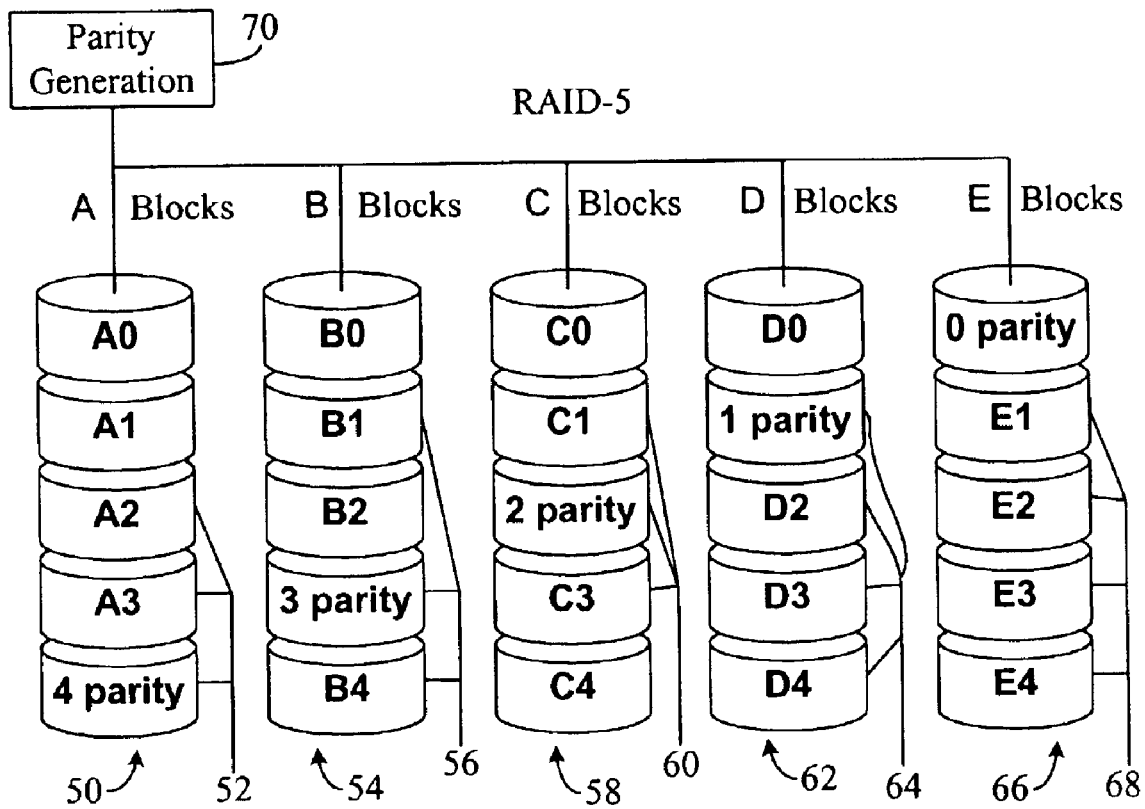

Upon creation, each component object is marked as a "blank" object, meaning that no data has been written into it yet. The blank entries are stored in corresponding OBDs and interpreted by various managers as signifying "empty" (i.e., without any data) objects. Because each component object is an object and not a block (as in the prior art storage schemes discussed with reference to FIG. 2 hereinbefore), each component object may require a minimal amount of space on the data storage device or OBD when empty and grow as data, or an increased amount of data, is stored therein. The manager 102 or a storage controller (not shown) in the client 94, 96 in the file system 100 may compute the parity information (as discussed hereinbelow) by treating an "empty" status or "blank" marking as indicating that the corresponding object contains the pseudo-data of all zeros (0). In other words, a blank object is "assumed" to contain all-zero data therein. This does not necessarily mean that the corresponding object actually has all zeros stored therein. Similarly, an object that is partially filled with file data may also be "assumed" to contain all-zero data in that portion of the object where no file data is presently stored. Thus, FIGS. 8A–8C symbolically illustrate that each empty or partially-filled stripe unit or object contains an all-zero data.

Figure 8B:
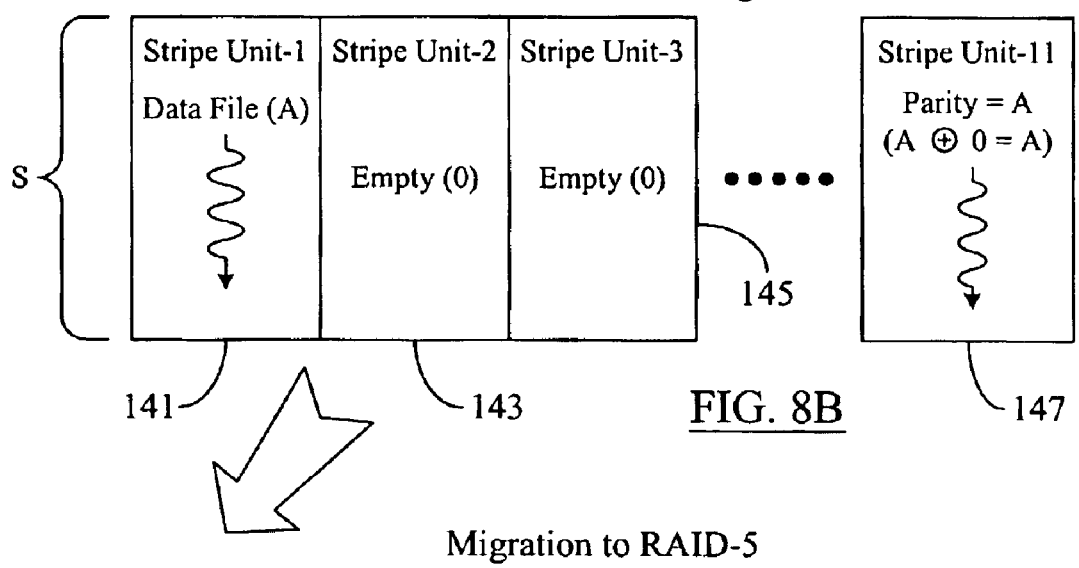
FIG. 8B shows an example of how a RAID-5 file object initially gets stored as a RAID-1 object according to the present invention.

FIG. 8B shows an example of how a RAID-5 file object initially gets stored as a RAID-1 object according to the present invention. For clarity of discussion, only relevant stripe units (i.e., stripe units 1–3 and 11) are shown in FIG. 8B. The details of stripe unit locations within OBDs (as shown in FIG. 8A) are omitted. For the sake of illustration, assume, for example, that 8 KB of data is to be written by a client 94, 96 to the data file using its component objects created at block 122 (FIG. 7). Because the data to be saved (8 KB) is less than the maximum storage allotted (64 KB) for the first stripe unit 141, the 8 KB of data will fit entirely in the first component object stored in that first stripe unit 141. The contents of that first stripe unit 141 are denoted by letter "A." Because the data file object is treated as a RAID-5 object, the parity information is then computed on the newly stored data "A." The parity is computed (e.g., by the client writing the data) by XORing the contents ("A") in stripe unit 141 with the contents in other nine stripe units 2–10 (only two of them, 143, 145, are shown in FIG. 8B) and then written (e.g., by the client) in the eleventh stripe unit 147.

As previously discussed, the file system interprets "blank" or "empty" stripe units 2–10 as containing the pseudo-data of all zeros. Therefore, the result of the XOR (exclusive-OR) operation is identical to the contents ("A") of the first stripe unit 141, because for any data "A", the equation "A⊕0=A" holds. In other words, the XOR operation results in generation of parity that is identical to the content ("A") of the data file object. Therefore, the data stored in the eleventh component object, or the "parity" object (in stripe unit 147), is a mirrored copy of the data stored in the first component object (in stripe unit 141), resulting in a RAID-1 storage of the data (as indicated at block 126 in FIG. 7). Here, the data-containing stripe unit 141 may be considered a "primary stripe unit" and the parity-containing stripe unit 147 may be considered a "mirrored stripe unit" in RAID-1 jargon. After writing the data in the first stripe unit 141 and parity in the eleventh stripe unit 147, the client may clear the associated "blank" markings on OBDs 140 and 146 respectively. The remaining OBDs still contain the blank markings, until data gets written into them.

Figure 1:
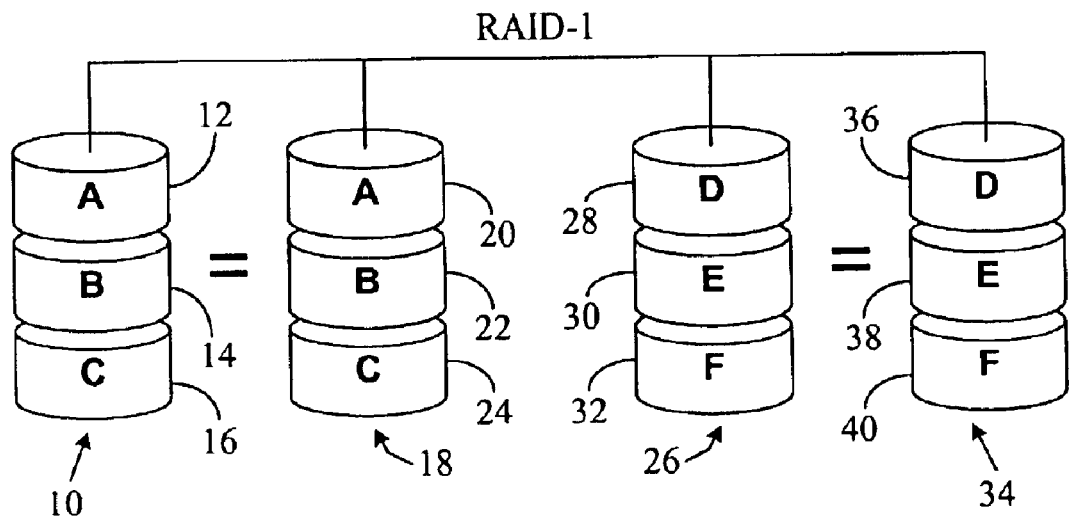
FIGS. 1 and 2 illustrate traditional RAID-1 and RAID-5 storage arrangements respectively.

Hence, until the file grows beyond the maximum size of the first stripe unit 141 (64 KB in the present example), the parity will remain an identical copy of the data being stored even though the file storage configuration is RAID-5. In other words, the data file effectively remains stored as a RAID-1 object (as indicated by blocks 128 and 130 in FIG. 7) so long as this size threshold (here, 64 KB) is maintained for the data file. Hence, the client 94, 96 may write to the data file using two-cycle writes for RAID-1 (discussed earlier with reference to FIGS. 1 and 2).

Figure 8C:
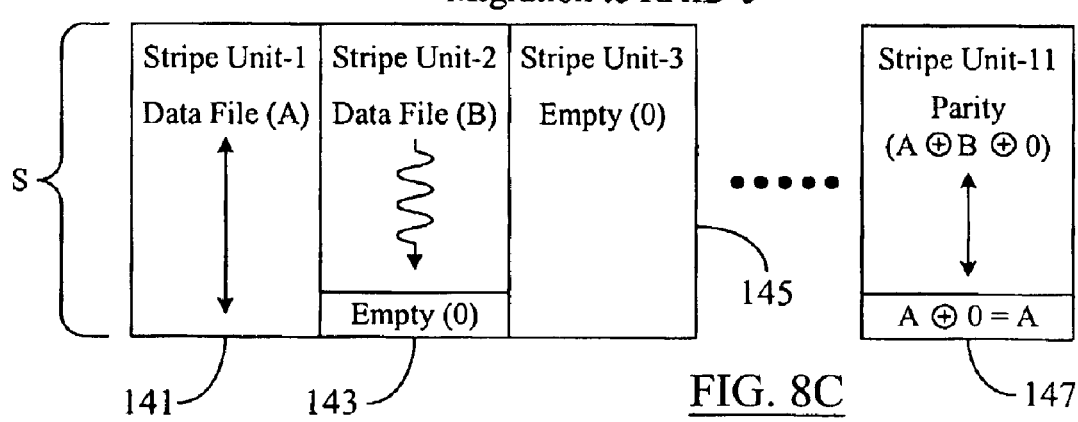
FIG. 8C illustrates how the data storage system according to the present invention migrates to RAID-5 storage without performing any rewrites for the data contained in the file initially stored as a RAID-1 object.

FIG. 8C illustrates how the data storage system according to the present invention migrates to RAID-5 storage without performing any rewrites for the data contained in the file initially stored as a RAID-1 object. When the file grows larger than the predetermined size threshold for a stripe unit (here, for example, 64 KB), the data for the file will no longer fit entirely in the first stripe unit 141. At that time, therefore, data will be stored in the first stripe unit 141 and at least one other stripe unit (e.g., the second stripe unit 143 in FIG. 8C). In that event, the parity is calculated on a file stored using more than a single stripe unit, and the result of the XOR parity calculation will no longer be an identical copy of the data in the first stripe unit 141. In other words, RAID-5 parity is generated without moving or rewriting the data earlier stored in the first OBD 140. The parity information written in the parity object (by, e.g., the client 94, 96) in stripe unit 147 is shown to contain, for example, two parts: the first part containing the parity generated by XORing the contents of the data file in stripe unit 143 (designated as letter "B") with corresponding contents ("A") in the first stripe unit 141 and in the remaining eight blank stripe units (all zeros); and the second part that is an identical copy of the corresponding data portion in the first stripe unit 141 because the XOR operation is performed under a situation that is similar to that shown in FIG. 8B.

Thus, as illustrated by FIGS. 8B and 8C, the storage methodology of the present invention achieves initial storage of a RAID-5 data file object in RAID-1 configuration and then migrates the storage from RAID-1 to RAID-5 configuration without performing additional data rewrites and without moving data from one OBD or one set of OBDs to another (as indicated at block 132 in FIG. 7). As noted hereinbefore, the manager 102 may create additional component objects and/or stripe units (block 131, FIG. 7) to accommodate any additional data to be stored. In other words, the storage methodology of the present invention does not require a strict pre-allocation or predetermination of the number of stripe units or component objects that may be required to store the entire data file. Instead, the required stripe units or component objects may be added as storage continues. For example, with reference to FIG. 8A, when all ten data stripe units (in OBDs 1–10) are full with the data for the data file, the manager 102 may create another stripe of eleven stripe units, with each additional stripe unit being stored in the same component object for the earlier-created stripe unit, resulting in a configuration similar to that illustrated in FIG. 10 for three OBDs. Alternately, the manager 102 may create additional component objects—one per OBD 140–146—and replicate the data storage layout similar to that shown in FIG. 8A for these newly created component objects.

When the data file grows beyond the predetermined size (e.g., 64 KB), the client may need to start performing 4-cycle writes (discussed earlier with reference to FIGS. 1 and 2) to keep the RAID-5 parity information correct. The SAM in the client may automatically decide which write technique (two-cycle writes for RAID-1 or four-cycle writes for RAID-5) to use based on whether or not the file has grown beyond the size of one stripe unit.

Figure 9A:
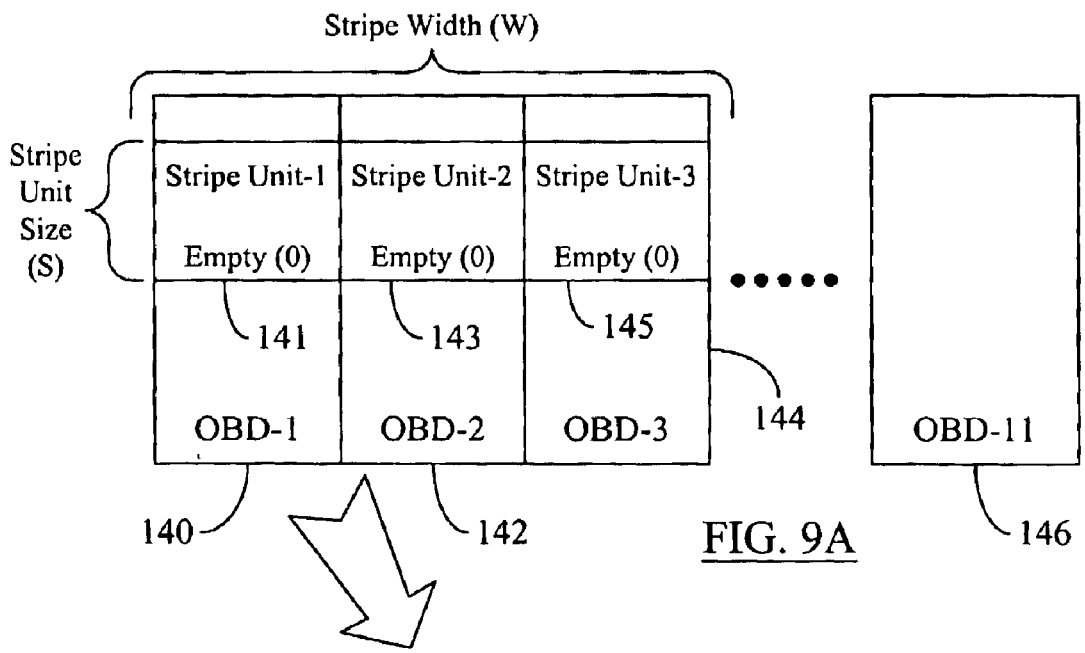
FIGS. 9A–9C illustrate an example of a striping and RAID-5 storage of a data file object using less than the total number of available OBDs.
Figure 9B:
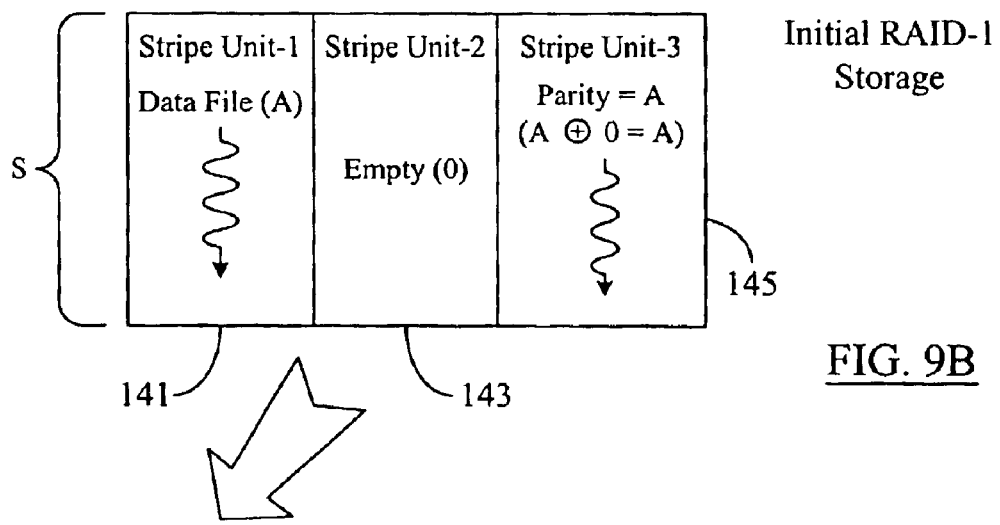
Figure 9C:
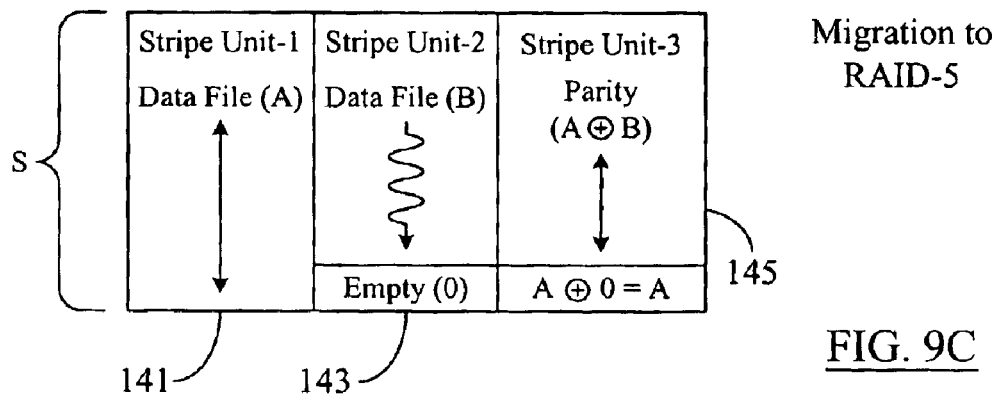

FIGS. 9A–9C illustrate an example of a striping and RAID-5 storage of a data file object using less than the total number of available OBDs. FIG. 9A shows that only three (140, 142, 144) out of eleven OBDs are used to store the data file. The first two stripe units 141, 143 may be considered as data stripe units and the third stripe unit 145 as the parity stripe unit. The OBDs not utilized to store the present data file object may be used to store other data file objects. Except for the smaller stripe width (three in FIG. 9A), the storage mechanism illustrated in FIGS. 9A–9C is identical to that shown in FIGS. 8A–8C respectively (as indicated by the use of similar reference numerals in FIGS. 9A–9C as those used in FIGS. 8A–8C). Therefore a detailed discussion of FIGS. 9A–9C is not provided herein. However, it is noted that the discussion given hereinabove with reference to FIGS. 8A–8C equally applies to the embodiment shown in FIGS. 9A–9C.

In both object-based storage scheme of the present invention and the prior art sector-based storage schemes, moving existing data from one disk to another involves copying the data into its new destination disk. However, the object-based storage scheme is more flexible in the sense that it allows the user to place the data-containing sectors anywhere on the disk. In a prior art sector-based RAID array, the physical sectors forming any particular stripe are completely fixed in the storage scheme. There is no possibility of interpreting non-existant stripe units as "all zeros" (as discussed hereinbefore with reference to, for example, FIGS. 8A–8C), because the sectors which are XORed together to form the parity exist physically on the storage media (i.e., the prior art sector-based storage disk). These sectors may not be considered as containing "all zeros" because they may physically contain some data (possibly unrelated to data file being stored). Whereas in an object-based storage, there is a layer of abstraction between the physical sectors on an OBD and the bytes of a data file. This layer of abstraction provides the ability to place the actual sectors-to-be-used anywhere on an OBD. On the other hand, in the prior art sector-based RAID storage, the sectors that are XORed together to form a parity unit are always the same, and are always uniquely identified on the corresponding disks. In an object-based RAID array, however, the OBD maintains a mapping table which allows significantly greater flexibility in moving sectors within an OBD.

It is noted that the determination of size threshold for a stripe unit (e.g., 64 KB) is directly linked to what size of file the system is configured to treat as a "small" file. For example, if "small" files are within 100 KB size, then the size threshold for a stripe unit may be set at 100 KB to achieve the desired migration from RAID-1 to RAID-5. It is further noted that the 64 KB size threshold for RAID-1/RAID-5 split is selected for illustrative purpose only. As discussed hereinbefore, any suitable size of storage space may be allocated or selected for the stripe units depending on many other factors including, for example, the total storage space in an individual OBD, the number of writes expected to be performed in the system, the type of writes (e.g., RAID-1 writes or RAID-5 writes) expected in the system, the desired level of redundancy and fault tolerance, etc. Further, it is observed that, as the file grows, the storage capacity overhead used to store its redundant data will shrink from 100% (in the initial RAID-1 configuration), reaching to 10% (in the 10+1 RAID-5 configuration) when the file spans a complete stripe (of 10 data stripe units and 1 parity stripe unit). The RAID-5 overhead percentage may change from 10% to any other percentage depending on whether more or less than eleven OBDs are used to store the aggregate data file object under RAID-5 configuration.

Figure 11:
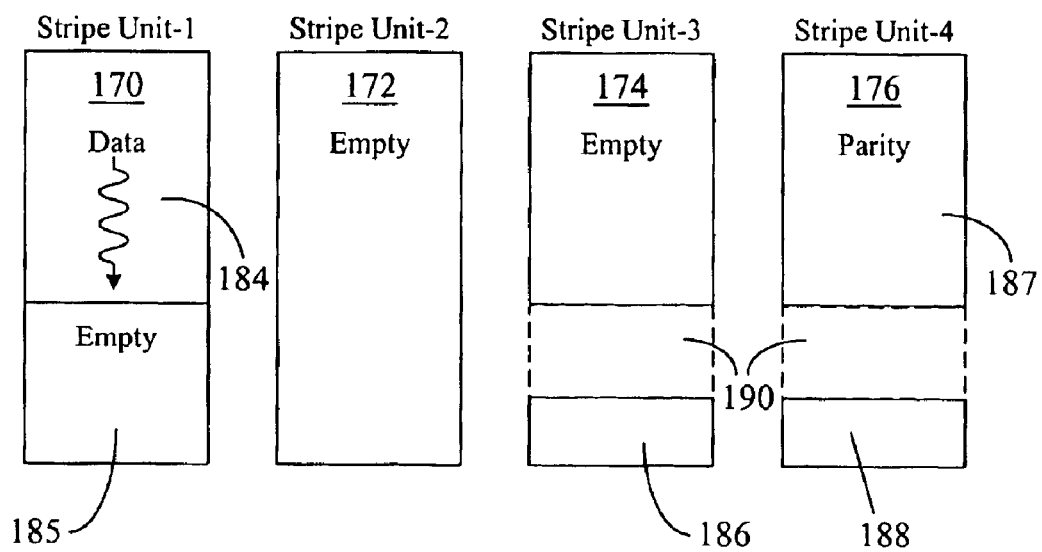
FIG. 11 illustrates a situation where a client writes a "hole" in a data file which is still being stored as a RAID-1 file.

FIG. 11 illustrates a situation where a client writes a hole in a data file which is still being stored as a RAID-1 file. FIG. 11 illustrates four exemplary stripe units (170, 172, 174, 176) storing a RAID-5 data file. Three of those stripe units 170, 172, 174 may contain the file data and the fourth stripe unit 176 may contain the parity information. It is noted that the configuration shown in FIG. 11 is for illustrative purpose only. In reality, there may be many more stripe units, or the parity may be stored in a stripe unit other than the last stripe unit (since this is a RAID-5 layout), or all the stripe units may not be of the same size, etc.

In a file system where the file abstraction is layered over the storage, a program may be allowed to "seek" within a file. That is, after an empty file is created (i.e., a file that is zero bytes in length), the program may "seek" or attempt to write to byte offset 1000 (for example) within that file and write some data at that location. This would create a "hole" in the file from byte 0 to byte 999. The program has never stored any data in this region in the file. If the program seeks back to offset zero and does a read to that location in the file, then most file systems would return all zeros in this never-written region. If the program seeks to offset 1000 and does a read, then the file system will return the earlier-written data. Most file systems do not actually consume any storage space (i.e., physical sectors on disks) for file system holes.

In FIG. 11, initially the client writes the file data in a portion 184 of the stripe unit 170. The other portion 185 in the stripe unit 170 is empty. Initially, the stripe units 172 and 174 are also empty (i.e., treated as containing all zeros as discussed hereinbefore), and the portion 187 in the parity stripe unit 176 contains a mirrored copy of the data in portion 184—thereby resulting in the RAID-1 storage for the data file. Later, the client may create a "hole" 190 in the file by writing a new data portion 186. The new data portion 186 may be written into a new stripe unit 174 or at a different, non-contiguous location (not shown) in the initial stripe unit 170. As can be seen from FIG. 11, the combined size of the original data portion 184 and the new data portion 186 is still within the total size of a stripe unit. Hence, the parity stripe unit 176 should continue to store a mirrored copy of the file data in portions 187 and 188. To accomplish continued RAID-1 storage, in one embodiment of the present invention, when the hole-creating write to the data file is to a new stripe unit (as shown, for example, in FIG. 11), the data file is logically switched from RAID-1 to RAID-5 storage configuration and the manager 102 is configured to assure that each "empty" component object (here, the component objects associated with the stripe units 172 and 174) is of sufficient logical length such that reads to those component objects will return all zeros (because the data file can still be stored with RAID-1 mirroring) instead of any error conditions.

The foregoing describes an object-based data storage methodology wherein a data file is initially saved in RAID-1 configuration (mirrored disks) and then migrated to RAID-5 configuration (rotating parity) when that file grows in size beyond a certain threshold (for example, beyond 64 KB). The migration is performed without rewriting the file data in RAID-5 configuration. Initially, the data file is created as an aggregate RAID-5 file object and its each component object (including the data objects and the parity object) is configured to be stored in a different stripe unit per object-based secure disk. Each stripe unit may store a predetermined size of data (for example, 64 KB). A blank component object (i.e., a component object without any data) or a partially-filled component object is treated as having all zeros stored in that portion of the component object where no data is presently stored. So long as the data file does not grow beyond the size threshold of a stripe unit (e.g., 64 KB), the parity stripe unit contains a mirrored copy (i.e., RAID-1 storage) of the data stored in one of the data stripe units because of the exclusive-ORing of the input data with all-zero content assumed in empty or partially-filled stripe units. When the file grows beyond the size threshold, the parity stripe unit starts storing parity information (i.e., RAID-5 storage) instead of a mirrored copy of the file data. Thus, with proper determination of a stripe unit size, among other things, a data file can be automatically migrated from RAID-1 storage to RAID-5 storage without the necessity to duplicate or rewrite the stored data in RAID-5 configuration. Use of such a storage methodology leads to many improvements in data storage performance and reliability.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for storing a data file in a storage system having a plurality of storage disks, said method comprising:

(a) providing a stripe across said plurality of storage disks, said stripe comprising a plurality of data stripe units and a parity stripe unit;

(b) storing said data file in a first format consistent with RAID-1 using only a first data stripe unit from said plurality of data stripe units and said parity stripe unit until a size of said data file exceeds an allocated storage space in said first data stripe unit, wherein during step (b) said parity stripe unit maintains a mirrored copy of data contained in said first data stripe unit; and (c) when the size of the data file exceeds said allocated storage space, storing said data file in a second format consistent with RAID-X and inconsistent with RAID-1 using said first data stripe unit, at least one further data stripe unit and the parity stripe unit wherein no rewriting of the data contained in the first data stripe unit occurs when storage of the data file transitions from said first format to said second format, and wherein RAID-X refers to a non-mirrored RAID scheme employing an XOR-based error correcting code.

2. A method for storing a data file in a storage system having a plurality of storage disks, said method comprising:

(a) providing a stripe across said plurality of storage disks, said stripe comprising a plurality of data stripe units and a parity stripe unit;

(b) storing said data file in a first format consistent with RAID-1 using only a first data stripe unit from said plurality of data stripe units and said parity stripe unit until a size of said data file exceeds an allocated storage space in said first data stripe unit, wherein during step (b) said parity stripe unit maintains a mirrored copy of data contained in said first data stripe unit; and (c) when the size of the data file exceeds said allocated storage space, storing said data file in a second format consistent with RAID-5 and inconsistent with RAID-1 using said first data stripe unit, at least one further data stripe unit and the parity stripe unit wherein no rewriting of the data contained in the first stripe unit occurs when storage of the data file transitions from said first format to said second format.

3. The method of claim 2, wherein step (a) includes allocating each stripe unit in said plurality of data stripe units and said parity stripe unit a respective storage space in a different one of said plurality of storage disks.

4. The method of claim 2, wherein the storing of said data file in said first format consistent with RAID-1 and RAID-5 in step (b) includes:

treating each data stripe unit except said first data stripe unit in said plurality of data stripe units as having all zeros stored therein;

combining data in said first data stripe unit with zeros assumed to be contained in each other data stripe unit in said plurality of data stripe units to generate a first parity data therefrom, wherein said first parity data is identical to said data in said first data stripe unit; and storing said first parity data in said parity stripe unit.

5. The method of claim 4, wherein the combining of said data in said first data stripe unit includes exclusive-ORing said data in said first data stripe unit with zeros assumed to be contained in each said other data stripe unit in said plurality of data stripe units.

6. The method of claim 5, further comprising:

monitoring when the size of the data file exceeds said allocated storage space;

wherein step (c) comprises:

storing data in the at least one further data stripe unit, wherein said data stored in the at least one further data stripe unit constitutes a portion of said data file that fails to get stored in said allocated storage space in said first data stripe unit; and exclusive-ORing said data in said first data stripe unit with said data in said at least one further data stripe unit.

7. A method for storing a data file object in a storage system having a plurality of storage disks, said method comprising:

(a) providing a stripe across said plurality of storage disks, said stripe comprising a plurality of data stripe units and one or more parity stripe units, wherein each stripe unit in said plurality of data stripe units and in said one or more parity stripe units is allocated a respective storage space in a different one of said plurality of storage disks;

(b) storing said data file object in a first format consistent with RAID-1 using only a first data stripe unit from said plurality of data stripe units and a first parity stripe unit from said one or more parity stripe units until a size of said data file object exceeds an allocated storage space in said first data stripe unit, wherein during step (b) said first parity stripe unit maintains a mirrored copy of data contained in said first data stripe unit; and (c) when the size of the data file object exceeds said allocated storage space, storing said data file object in a second format consistent with RAID-5 and inconsistent with RAID-1 using said first data stripe unit, at least one further data stripe unit and one or more parity stripe units wherein no rewriting of the data contained in the first data stripe unit occurs when storage of the data file object transitions from said first format to said second format.

8. The method of claim 7, wherein said plurality of storage disks includes a plurality of object based secure disks (OBDs).

9. The method of claim 7, wherein said plurality of data stripe units includes a variable number of data stripe units.

10. The method of claim 7, further comprising:

creating a plurality of component objects for said data file object, wherein each said component object is configured to be stored on a different one of said plurality of storage disks, and wherein all component objects together constitute said data file object; and associating each said component object with a different stripe unit selected from said plurality of data stripe units and said one or more parity stripe units.

11. The method of claim 10, further comprising:

creating said data file object prior to striping said data file object; and associating a layout map with said data file object upon creation of said data file object, wherein said layout map describes how said data file object is to be stored in said storage system.

12. The method of claim 11, wherein said layout map contains at least one of the following:

a first information about a storage layout scheme for said data file object including an identification of said data file object and an indication of initial storage of said data file object in said first format consistent with RAID-1 and RAID-5;

a second information about which one or more of said plurality of storage disks are to be used to store said data file object;

a total number of stripe units in said plurality of data stripe units and said one or more parity stripe units;

said respective storage space allocated to each said stripe unit;

a set of object identifiers, wherein each object identifier is associated with a different one of said plurality of component objects; and a set of initial entries created along with said plurality of component objects, wherein each initial entry marks a corresponding one of said plurality of component objects as a blank object so long as no data is written to said corresponding one of said plurality of component objects.

13. The method of claim 7, wherein the storing of said data file object in said first format consistent with RAID-1 and RAID-5 in step (b) includes:

initially treating each said stripe unit in said plurality of data stripe units as having all zeros stored therein;

commencing storing said data file object in said first data stripe unit;

combining data in said first data stripe unit with zeros assumed to be contained in each other stripe unit in said plurality of data stripe units to generate a first parity data therefrom, wherein said first parity data is identical to said data in said first data stripe unit; and storing said first parity data in said first parity stripe unit.

14. The method of claim 13, wherein the combining of said data in said first data stripe unit includes exclusive-ORing said data in said first data stripe unit with zeros assumed to be contained in each said other stripe unit in said plurality of data stripe units.

15. The method of claim 13, further comprising:

monitoring when the size of the data file object exceeds said allocated storage space;

wherein step (c) comprises:

storing data in the at least one further data stripe unit, wherein said data stored in the at least one further data stripe unit constitutes a portion of said data file object that fails to get stored in said allocated storage space in said first data stripe unit; and exclusive-ORing said data in said first data stripe unit with said data in said at least one further data stripe unit.

16. The method of claim 7, wherein said allocated storage space stores a predetermined size of data.

17. The method of claim 7, further comprising dynamically allocating storage space to each said stripe unit.

18. The method of claim 7, wherein step (a) further comprises:

creating a first stripe having a first plurality of stripe units, wherein said first plurality of stripe units includes a first set of data stripe units from said plurality of data stripe units and said first parity stripe unit, wherein respective storage space for each stripe unit in said first plurality of stripe units is of a first size; and creating a second stripe having a second plurality of stripe units, wherein said second plurality of stripe unit includes a second set of data stripe units from said plurality of data stripe units and a second parity stripe unit from said one or more parity stripe units, wherein respective storage space for each stripe unit in said second plurality of stripe units is of a second size, and wherein said second size is different from said first size.

19. The method of claim 18, wherein said first size is smaller than said second size.

20. The method of claim 18, wherein creating said second stripe includes creating said second stripe when the combined storage space offered by said first set of data stripe units in said first plurality of stripe units is insufficient to store said data file object.

21. An object-based storage system for storing a data file object comprising:

a plurality of object based secure disks (OBDs);

means for striping said data file object across said plurality of OBDs using a plurality of data stripe units and a parity stripe unit;

means for allocating a respective storage space to each stripe unit in said plurality of data stripe units and said parity stripe unit in a different one of said plurality of OBDs;

first means for storing said data file object in a first format consistent with RAID-1 using only a first data stripe unit from said plurality of data stripe units and said parity stripe unit until a size of said data file object exceeds an allocated storage space in said first data stripe unit, wherein said first means for storing causes said parity stripe unit to maintain a mirrored copy of a data contained in said first data stripe unit; and second means for storing said data file object in a second format consistent with RAID-5 and inconsistent with RAID-1 using said first data stripe unit, at least one further data stripe unit and said parity stripe unit when the size of said data file object exceeds said allocated storage space, wherein no rewriting of the data contained in the first data stripe unit occurs when storage of the data file object transitions from said first format to said second format.

22. The system of claim 21, wherein said first means for storing includes:

means for initially treating each said stripe unit in said plurality of data stripe units as having all zeros stored therein;

means for commencing storing said data file object in said first data stripe unit;

means for exclusive-ORing said data in said first data stripe unit with zeros assumed to be contained in each other stripe unit in said plurality of data stripe units to generate a first parity data therefrom, wherein said first parity data is identical to said data in said first data stripe unit; and means for storing said first parity data in said parity stripe unit.

23. The system of claim 22, further comprising:

means for monitoring when the size of said data file object exceeds said allocated storage space in said first data stripe unit;

wherein said second means for storing comprises:

means for storing data in the at least one further data stripe unit, wherein said data stored in the at least one further data stripe unit constitutes a portion of said data file object that fails to get stored in said allocated storage space in said first data stripe unit;

means for exclusive-ORing said data in said first data stripe unit with said data in said at least one further data stripe unit.

* * * * *